US005146703A

United States Patent [19]

Boden

[11] Patent Number: 5,146,703

[45] Date of Patent: Sep. 15, 1992

[54] LENTICULAR SIGNS WITH DISCRETE LENS ELEMENTS

[76] Inventor: Edward Boden, 218 Erica St., Philadelphia, Pa. 19116

[21] Appl. No.: 648,911

[22] Filed: Feb. 1, 1991

[51] Int. Cl.[5] .............................................. G03B 25/02

[52] U.S. Cl. ...................................................... 40/454

[58] Field of Search ................. 40/454, 453, 446, 436; 359/483, 619, 626

[56] References Cited

U.S. PATENT DOCUMENTS

| | | | |
|---|---|---|---|
| 2,371,172 | 5/1940 | Hotchner . | |
| 2,507,975 | 5/1950 | Hotchner . | |
| 2,514,814 | 7/1950 | Towne | 40/454 X |
| 2,833,176 | 5/1958 | Ossoinak . | |
| 3,314,179 | 4/1967 | Leach . | |
| 3,918,185 | 11/1975 | Hasala . | |
| 4,255,380 | 3/1981 | Björkland . | |
| 4,734,037 | 3/1988 | McClure . | |

*Primary Examiner*—James R. Brittain
*Assistant Examiner*—J. Bonifanti
*Attorney, Agent, or Firm*—Eckert, Seamans, Cherin & Mellott

[57] ABSTRACT

A lenticular or segmented sign for selectively viewing at least two separate images includes an image panel having at least two image fields subdivided into segments grouped in interleaved fields. A lens panel is provided by discrete and relatively movable lens elements carried on a facer panel, the lens elements including two or more lenses and being resiliently fixed to the facer panel at the top, adjacent lens elements being free to move relative to one another along their lengths. The lenses are preferably elongated vertical or horizontal strips attached to a transparent facer panel by hook or spring fasteners which engage in connectors by which adjacent lenses are attached together to form a lens element. The lens elements have spacer posts for positioning the lenses at the correct focal distance from the image strips. Compressible material or springs urge the lens elements laterally together, and as a unit the lens segments define a predetermined pitch notwithstanding manufacturing tolerances of the individual lenses. The pitch of the image segments is slightly larger than the pitch of the lenses, for allowing accurate viewing at close perspective. The lens panel is carried in a framing bracket which is adjustable to correct parallelism of the lenses relative to the image strips.

14 Claims, 3 Drawing Sheets

LENTICULAR SIGNS WITH DISCRETE LENS ELEMENTS

BACKGROUND OF THE INVENTION

1. Field of the Invention

This invention relates to the field of changing displays, in particular lenticular signs having a plurality of lenses aligned to at least two distinct interleaved and segmented background fields, whereby the lenses display only one field and then only the other field as the perspective of the viewer changes, e.g., while passing the sign. The sign can display related copy on the two fields, can simulate motion via animation, etc. According to the invention the lenses are parts of a lens panel made from discrete segments of one or more lens elements. The lens elements are mounted to overcome variations in dimensions of individual lenses, to facilitate access for changing the copy, and include a framing structure fixing the lenses relative to the image. In a large format sign the invention overcomes problems with misalignment of the lens elements and the background field segments which would detract from the discrete selection of one or the other of the images for viewing.

2. Prior Art

Lenticular signs having two or more interleaved display fields, and a superimposed lens arrangement to shift between them, are well known in small displays such as toys but have not been successfully applied to large format advertising displays, especially with changeable (reloadable) copy, due to very substantial problems in achieving the necessary accuracy in large signs. The basic idea of a lenticular sign is to provide a regular pattern of individual lenses across a field, positioned over a background panel on which the copy appears. The copy includes two or more images, each of which has been subdivided, e.g., in strips for strip-like lenses or in other shapes corresponding to the lens shapes. These strips or the like from the two or more images are interleaved on the background panel such that a segment from a corresponding area of each of the two patterns is placed behind each lens segment. Due to diffraction through the lenses, the light path along the direction of view for most viewing angles exposes one of the image segments only (for viewer perspectives or angles which are normal to the lens and aligned to the image segments, both images appear). By varying the angle of view and/or the relative alignment of the lenses to the image panel, the display is caused to select one or another pattern for viewing. This phenomena can be applied to a fixed arrangement of the lens panel relative to the image panel, whereupon the angle of view changes as the viewer passes in front of the sign, or alternatively the lens panel and image panel can be relatively moved in an oscillating motion by a motor or the like, to cause the image presented to a stationary viewer to cycle between the respective images.

Lenticular signs can have lens elements disposed in an X-Y array or in a strip-like array. Examples of such signs in an X-Y array include U.S. Pat. Nos. 2,371,172, 2,507,975-Hotchner; and U.S. Pat. No. 2,833,176-Ossoinak. Examples of similar arrangements for multiple image displays in a strip like format are disclosed for example in U.S. Pat. No. 3,314,179-Leach; U.S. Pat. No. 3,918,185-Hasala and U.S. Pat. No. 4,255,380-Bjorkland.

In each case, the objective is to place the lens elements at a distance from an image panel determined by the shape or focal length of the lens segments. The image panel has two or more segmentally interleaved images with segments of each of the two or more images positioned behind the lens elements. The image segments are placed side by side behind the lenses to define an image segment group. Each lens displays the underlying discrete segment of each of the images from its group, one at a time. As the viewer's perspective on the lens elements changes relative to the image segments, the lens elements all display their individual image segments from the same one of the interleaved fields, thereby changing from a display of one overall image field to a display of another.

Segmented lenticular signs of the foregoing description are well known in connection with toys and similar small, hand held display panels. In small display panels, the lens segments are formed integrally, e.g., as a molded sheet with ridges on one side, permanently attached to the image panel such that the alignment of the lenses to the image segments is relatively assured. Typically, the image is printed or glued onto the lens panel, which is molded of plastic to provide ridges forming the lenses. In connection with larger displays there are substantial problems incurred in applying the idea to a practical embodiment. A major difficulty in setting up a large display of this type is that the pitch of the lens elements and the position of the lens elements must correspond very precisely with the segments of the display fields and it is not readily possible or practical to provide an integral lens panel and image in a large sign. Each lens across the display must be positioned to correspond to the respective division between the display field segments to which that lens segment is applied. In order to achieve the necessary accuracy substantial attention must be paid to the dimensions and relative positions of the lenses, the dimensions and relative positions of the display field segments, and the correct placement of the lenses relative to the display field segments.

It would be quite desirable to provide a large format lenticular sign as a form of advertising. The changeable nature of the copy and the possibility of an animated presentation would generate substantial interest. A given space can display two messages rather than one. Preferably such a sign would allow the copy to be changed periodically in a convenient manner, as typical of billboards.

However, a large format sign is more difficult to arrange accurately than a small format sign, due to dimensional tolerances in manufacturing and due to problems in alignment upon mounting the lenses relative to the interleaved image segments. For example, in a hot forming molding or extruding process for plastics, the resulting dimensions may be determined in part by the temperature of processing and the cooling cycle. Where a lens panel is made in this manner the edges of the panel will normally cool more quickly than the central area, resulting in variations in pitch of the lenses across the lens panel due to differential shrinkage. While a mold or extruder having a pitch which varies to cancel the effects of differential shrinkage is theoretically possible, the process and resulting product would be too expensive to be cost effective.

Differential thermal expansion can also occur in use, between a lens element and an image panel particularly where the lens element forms the external panel over an image panel, thereby forming a greenhouse-like heat trap. These problems are aggravated if one attempts to provide a large format display wherein the image panel is to be changeable to allow a change in copy while retaining the lenses and the image panel mounting structure. The same features which allow access to the image panel for changing it tend to allow misalignment, pitch variation, or improper spacing of the lenses relative to the image panel segments.

Variations in pitch substantially detract from the effectiveness of the multiple field display. Where the pitch is inaccurate a viewer of the display will see portions of both displays or different ones of the display fields in different areas of the display. Thus the images are superimposed or mixed, rather than, as intended, changing crisply from a display of only one entire display field followed by the other entire display field. These problems, and the substantial attention to dimensions and alignment which are required to overcome them, have made large format lenticular signs impractical. While smaller signs have been produced (e.g., up to one or two feet on a side), the technology has not allowed a larger sign as suitable for advertising, e.g., occupying all or a substantial part of a billboard, which may be 10 meters on a side. It has been too difficult or expensive to provide the necessary precision in the dimensions and arrangement of the lens panel and the display panel, particularly since no means were provided to allow the display panel to be changed while re-using the lens panel.

According to the present invention, however, the dimensional tolerance of a lens panel is improved by dividing the lens panel into discrete lens elements of one or more lenses, which are arranged to resiliently bear against one another. Whereas the tolerances of individual lens elements may vary, the pitch proceeding across the overall display remains very regular. In a preferred embodiment wherein two or more lenses form a lens element, dimensional variation of the lenses can be corrected when attaching them to form a lens element, whereby a large sign produced from a series of abutted lens elements has a very regular pitch, much better than possible considering the dimensional tolerances of the lenses themselves. The individual mounting of the lens segments also permits the entire display to be assembled and disassembled readily for cleaning, replacement or for changing the sign copy. The pitch of the lenses and the display panel can be relatively varied across the face of the sign. For example, by increasing the pitch of the display field segments relative to the pitch of the lenses, the lens segments select the display fields accurately at a closer perspective where parallax would otherwise interfere. The invention thus provides a practical and effective application of the field of lenticular signs to large format sign for example, as appropriate for advertising billboards.

SUMMARY OF THE INVENTION

It is an objective of the invention to reduce the need for dimensional accuracy in lens panels for lenticular signs, by subdividing the lens panel into discrete lens elements of one or more lenses.

It is a further object of the invention to render a lenticular sign insensitive to thermal expansion variations, by a particular construction placing the lens elements and the display panel in proximity, with the lens elements free to expand and contract relative to one another.

It is a further object of the invention to accurately place the lens elements relative to the display panel in a lenticular sign, as a result of inherent structural features of the lens elements.

It is also an object to facilitate variation of the spacing between bodies forming lenses in a lenticular sign, for canceling dimensional variations in the lenses and for permitting a predetermined desirable variation in pitch between the lenses and the image strips.

It is yet another object of the invention to provide a convenient mounting for a lenticular sign on a base, including means for adjusting the parallelism of the lens elements relative to the image strips.

These and other objects are accomplished by a lenticular or segmented display for selecting between at least two separate images. The display includes an image panel having at least two image fields sub-divided into segments grouped in interleaved fields. A lens panel is provided by discrete and relatively movable lenses, preferably attached in groups of two or more to form lens elements. The lens elements are carried on a facer panel, for example being resiliently fixed to the facer panel at the top, and free to expand relative to one another along their lengths. The lenses are preferably formed by elongated transparent plastic strips, attached together in groups by connectors, to form lens elements. The lens elements are mounted at the rear of a transparent facer panel by hooks or spring clips which engage in the connectors. Compressible material or springs urge the lens elements laterally together.

The dimensions of the lenses (specifically width) may vary due to manufacturing tolerances on either side of nominal dimensions, tending to average out across the face of the display. However to avoid a lens pitch problem when a number of successive lenses are wider or narrower than nominal (which is not uncommon for units produced in a given batch), the lens elements comprising two or more lenses are preferably arranged such that the lens elements are formed at a closer tolerance than the lenses themselves. This can be done by spacing the lenses to the maximum width of lens dimension (e.g., by shimming the lenses before attaching the connectors. The discrete nature of the lens elements allows the pitch to be held very constant. The pitch of the display segments can be slightly larger than that of the lenses, for allowing accurate viewing at a closer perspective. The lenses are carried on a facer panel which mounts in a framing bracket. The framing bracket is adjustable in position relative to a base which carries the image panel, such that the parallelism of the lenses and the image strips can be readily adjusted. Additional aspects of the invention are discussed hereinafter with reference to exemplary embodiments of the invention.

BRIEF DESCRIPTION OF THE DRAWINGS

There are shown in the drawings the embodiments that are presently preferred. It should be understood, however, that the invention is not limited to the precise arrangements and instrumentalities shown in the drawings, and is capable of embodiment in other specific groupings of elements and sub-elements as disclosed. In the drawings.

DETAILED DESCRIPTION OF THE PREFERRED EMBODIMENTS

Figure 1:
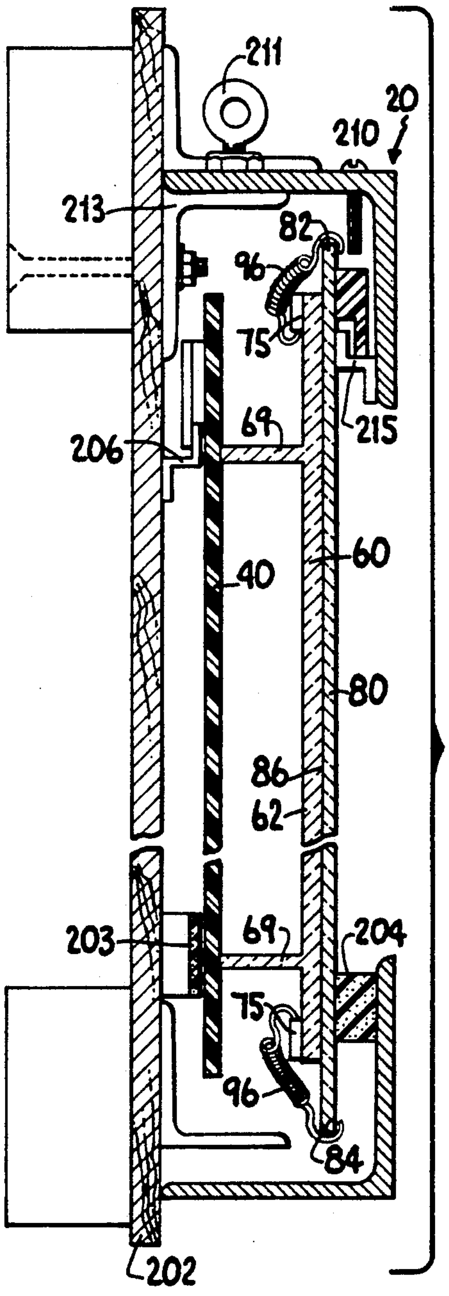
FIG. 1 is a section view along a vertical line through a display unit according to the invention.
Figure 2:
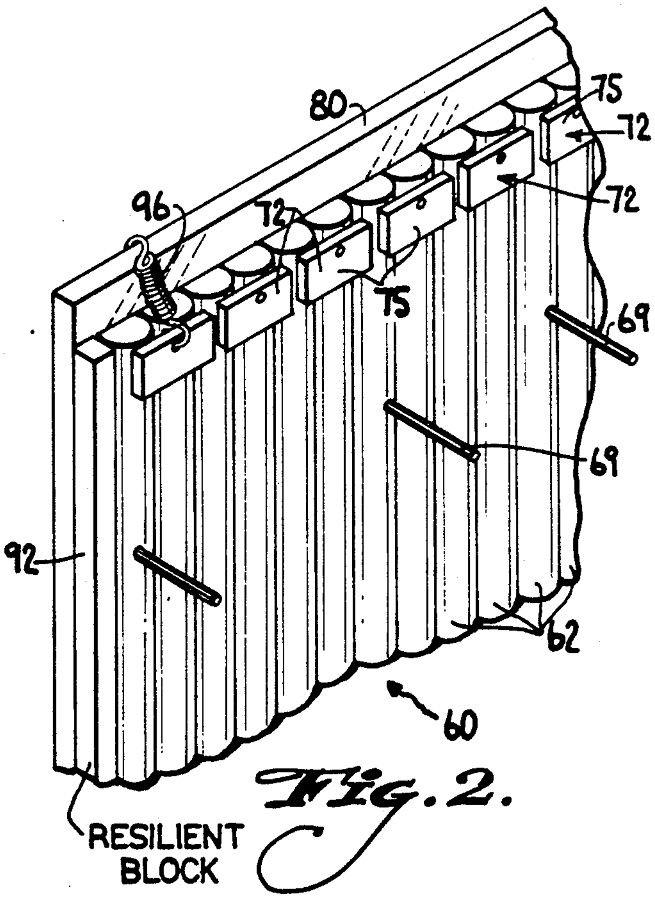
FIG. 2 is a perspective view of a facer panel and attached lens elements.
Figure 4:
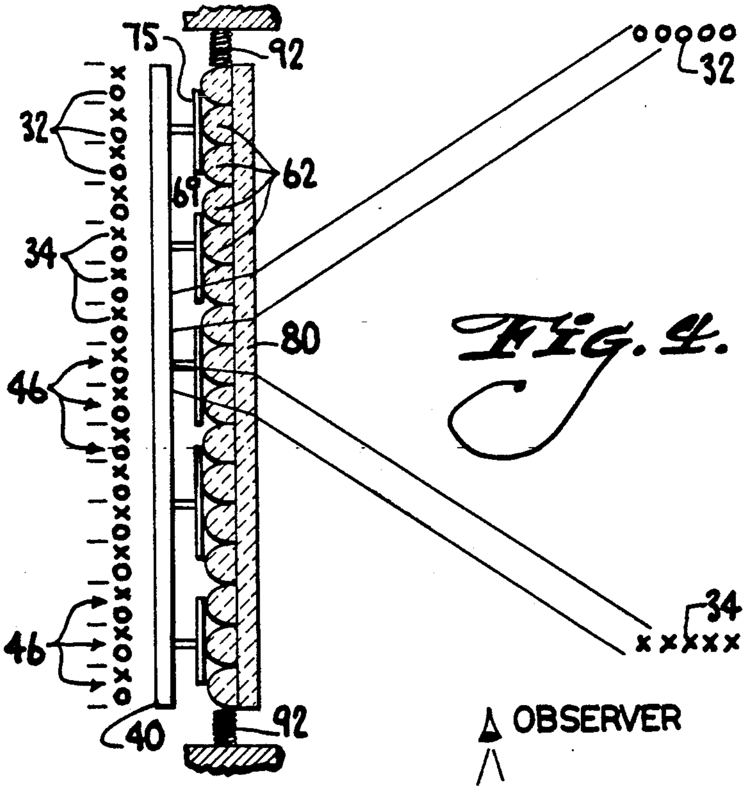
FIG. 4 is a section view through a display according to the invention along a horizontal line, illustrating the relationship of the lens segments, lens elements and display segments, the display segments being shown figuratively by X's and O's.

According to the invention as shown in FIG. 1, a display 20 for multiple image fields is provided. The display 20 is arranged such that at least two images are viewable through a transparent contoured lens panel 60, the particular image viewed depending on the perspective or angle of view of an observer relative to the plurality of lenses 62 which are disposed across the display. As also shown in FIG. 2, which depicts the lens panel 60 from the rear, the individual lenses 62 are formed by the ridged shape of the lens panel 60. Lens panel 60 is formed of a plurality of lens elements 72, each preferably having two or more lenses 62. As shown in FIG. 4, the lenses 62 each select which of at least two segmentally interleaved image patterns ("XXX . . . " or "000 . . . ") is seen by the observer, via diffraction of the light paths leading from the observer to an image panel 40 behind the lens panel 60. It is also possible that such a display can operate on the basis of a fixed viewing angle (e.g., normal to the display), with the lenses selecting the particular image displayed by illumination from different angles (e.g., changing images based upon whether the sun shines from the East or West). The invention is discussed herein with primary reference to an arrangement wherein changes in the viewing angle select the displayed image. However, the invention is also applicable to displays wherein changes in illumination are used for image selection, as well as displays wherein the relative positions of the image panel and the lens panel are changed, for example by a motorized oscillator or the like, for changing the image seen by a stationary observer by varying the relative positions of the lenses and the corresponding segments of the images.

The image panel 40 has at least two image fields, each encompassing the length and width of the display. However, the image fields are subdivided into strips parallel to the lenses 62 and spaced at the pitch spacing of the lenses 62 into image segments 32, 34. The image segments each encompass a strip of their respective image fields (X or O), which are interleaved in known manner. The portion of the display behind any given one of the lenses 62 includes two or more image segments (one for each of the selectable image fields), arranged adjacent one another and forming a group of image segments of the same size as the respective lens 62. Where two images are provided, each lens 62 is aligned to two segments 32, 34, each segment occupying half the space behind the lens. Accordingly the grouped image segments from the two (or more) image fields are spaced to define an image, pitch spacing extending across at least one of a length and width of the display. As a result of diffraction through the lenses 62, when an observer sees the display 20 from a perspective other than precisely normal to the display surface, such as the two perspective angles illustrated in FIG. 4, the lenses 62 all select the image segment from one of the interleaved fields (X or O), and the other field is occluded by the lenses. In this manner the image seen by the observer changes.

Referring to FIGS. 1, 2 and 4, the lenses 62 are provided on a lens panel 60 and define a lens pitch spacing corresponding substantially to the image pitch spacing (although this can be varied as discussed hereinafter). According to the invention, the lens panel comprises a plurality of discrete and relatively movable lens elements 72, each having at least one lens 62, with the overall lens panel 60 being made up of individual lens elements 72 which are separate elements but are abutted against one another. The lens elements 72 are dimensioned to abut one another such that the lenses 62 are positioned at the lens pitch spacing corresponding to the image pitch spacing, whereby the multiple images in the display fields are selected.

Means are provided for mounting the lens elements 72 adjacent one another over the groups 46 of image segments 32, 34 of the image panel 40, so as to allow relative motion between abutted successive ones of the lens elements 72 in at least one direction, i.e., along their lines of abutment (vertically in FIG. 2).

Whereas an integral lens panel arranged with lenses formed in the surface of a one-piece panel is subject to variations in the position of the lenses due to dimensional tolerances, by arranging the lenses 62 as separate pieces or as parts of discrete lens elements 72 having a limited number of lenses 62 connected to one another (e.g., two to twelve), the dimensional variations of the lenses are accommodated while the lens panel 60 as a whole remains in substantial correspondence with the image pitch spacing.

In the preferred embodiment shown, the lenses 62 and the image segments 44 are defined by elongated strips. The lenses 62 are at least as long as the image segments 44, but the image segments of each field are a fraction of the width of the corresponding lenses such that the grouped image segments 46 in each case equal the width of the corresponding lens 62. The lenses 62 are fixed relative to the image panel 40 in their spacing from the image panel (i.e., at the focal length of the lenses) and in their position in the plane of the lens panel 60 relative to their respective grouped image segments (normally each is centered over one of the grouped image segments 46). However, the lens elements 72 are movable relative to one another along abutments parallel to a line of elongation of the lenses 62, thus accommodating expansion and contraction along the length of the lenses.

A transparent facer panel 80 actually holds the lens elements 60 and their lenses 62 in place. The lens elements 72 are suspended at least from the top of the facer panel 80, and preferably are attached at both the top 82 and bottom 84 of the facer panel 80 in a manner permitting relative movement of the lens elements.

For ensuring that the lens elements 60 remain in abutment, laterally bearing resilient means 92 urge the lens elements into abutment, i.e., pressing them together in a direction perpendicular to the direction of elongation of the lenses. This can be accomplished using a spring like element as shown generally in FIGS. 4 and 6, or the laterally outermost lens elements can bear against a resiliently compressible material as shown in FIG. 2.

Figure 7:
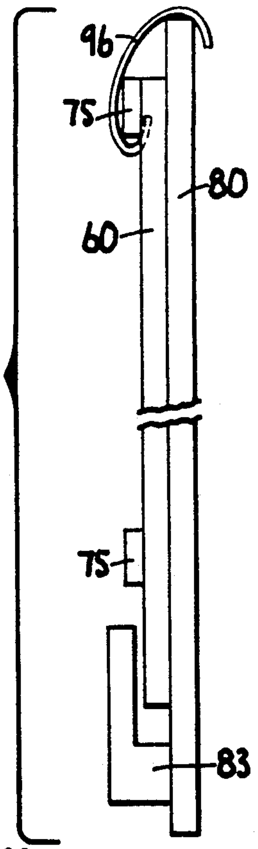
FIG. 7 is a vertical section view illustrating an alternative embodiment of the facer panel and lens panel arrangement; and, FIG. 8 is an exploded perspective view illustrating the base and framing structures.

The lenses and image strips can be elongated vertically, horizontally or in another direction. In a vertically elongated arrangement the lens elements 72 can be simply hung from the facer panel by a connecting hook passed over the top 82. Such an embodiment is shown in FIG. 7. As also shown in FIG. 7, the bottom of the lens elements 72 can be received in a loose retaining flange 83 affixed to the back side of the facer panel. Alternatively, the bottoms of the lens elements can be attached to the facer panel via a spring fastener as shown in FIG. 1. These arrangements each allow the lens elements some freedom to move relative to the facer panel and one another during expansion and contraction, yet retains the lens elements generally in place.

A resilient fastener such as a spring hook 96 can be used at the top and bottom of the facer panel, as shown in FIG. 1. A hook or spring fastener preferably extends between each of the lens elements 72 and at least one of the opposite edges of the facer panel (e.g., top 82 and bottom 84 of the facer panel 80 in the vertically elongated lens embodiment shown), positively holding the lens elements 72 against the rear face of the facer panel. Preferably, and as shown in the drawings, the lens elements 72 are attached to the facer panel 80 at both the top and bottom of the facer panel by spring fasteners or the like, and urged laterally inward by means 92.

Figure 3:
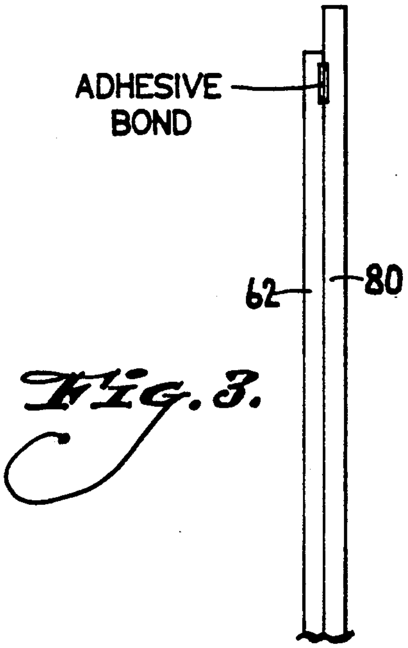
FIG. 3 is a vertical section through a lens panel and facer panel according to an alternative embodiment of the invention.

In an alternative embodiment shown in FIG. 3, the lenses 62 are bonded to the rear surface of the facer panel 80, at the tops of the lenses. This arrangement also permits expansion and contraction of adjacent lenses 62 (or perhaps adjacent lens elements each including a plurality of lenses) along their line of elongation. However, the lateral position of the lenses is thereby fixed. Provided the facer panel 80 has a thermal expansion characteristic comparable to that of the lenses 62 and to that of the image panel, the tops of the lenses can be fixed to the facer panel as shown, without adverse effects on the alignment.

Figure 5:
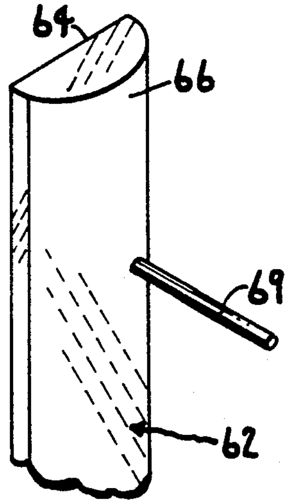
FIG. 5 is a partial perspective view illustrating a single lens.

The lenses 62 as shown in FIG. 5 have a flat side 64 and a rounded side 66. The flat side is disposed against a rear side of the facer panel 80 and the rounded side is oriented toward the image panel 40. Accordingly, the outside of the display as a whole is flat and readily cleaned. The facer panel 80 can be ultraviolet blocking (e.g., coated) glass, to better protect lenses 62 from clouding with exposure to ultraviolet. The lenses 62 and lens elements 72 are preferably plastic and are protected from weathering and sun damage by the facer panel. In the embodiments shown in FIGS. 1, 2 and 4, any difference in thermal expansion characteristics of the facer panel 80 and the lens elements 72 is of no moment due to the movable mounting of the lens elements on the facer panel.

The facer panel 80 is advantageously mounted in a manner allowing a slight displacement in a direction toward and away from the image panel 40. A spacer post 69 as shown for example in FIGS. 1 and 5, protrudes from at least some of the lens elements in a direction perpendicular to the image panel 40. The spacer post bears against the image panel 40 to maintain a correct focal length of a respective lens 62 relative to the image fields, i.e., relative to the front surface of the image panel 40. Whereas the spacing between the lenses 62 and the image fields on the image panel 40 are thus set, the precision of mounting of the facer panel 80 and the image panel 40 is not crucial. Accordingly, the image panel can be made easily replaceable, and the facer panel can be made easily removable for cleaning or the like.

The lenses 62 can be aligned to the image segments in a direction perpendicular to the elongation of the lenses (i.e., parallel to the planes of the image panel and the lens panel), or can be offset. The lenses 62 and the image panel 40 preferably are aligned initially when setting up the display, and do not vary substantially thereafter because the lens panel and the image panel are hung on horizontal flanges 206, 215 which do not readily allow the panels to slide back and forth. Should the lenses become misaligned, an adjustable fitting or the like (not shown) such as a threadably movable abutment can be provided to enable the image panel and/or the lens panel to be shifted laterally in a controlled manner until the display cleanly separates the multiple images when viewed at the desired perspective angle.

To reduce pitch variation between the image panel and the lenses with temperature cycling, the lens panel and the image panel preferably are composed of materials having substantially equal thermal expansion properties.

The lens elements 72 preferably include two to six lenses 62, and thus are elongated strips. The lenses 62 making up each lens element 72 are attached together, preferably at the top and bottom thereof, by connectors 75 (FIGS. 1, 2 and 4) bridging across the otherwise separate lenses 62. One or more additional connectors 75 (not shown) can be included intermediate the end connectors, to stiffen the lens elements. The connectors 75 are bonded to each of the lenses 62 in the lens element 72. The connectors 75 form a convenient point of attachment for a hook (FIG. 7) or spring fastener (FIG. 1) or the like, connecting the lens element 72 to the facer panel 80 at least at one of the top 82 and the bottom 84 of the facer panel. A hook for this purpose can be a simple wire "C" shape as in FIG. 7. A spring fastener 96 as shown can be a helical spring with a loop at each end adapted to engage the connector 75 and the facer panel 80, respectively. In an embodiment having only one or two lenses in a lens element (or any even number of lens elements), one hook or spring fastener at the top and a spring fastener 96 or retaining structure 83 at the bottom is normally adequate. It is presently preferred that only a single spring fastener be employed at the top, centered relative to the center of gravity of the lens element, to avoid any tendency of two spaced fasteners of unequal length or strength to cant the axis of elongation of a lens element relative to the image segments.

The invention provides a relatively inexpensive means for manufacturing custom lenticular signs and lens panels therefor, particularly in large formats as appropriate for change-copy and animation signs, displays, panoramas and murals. It is not necessary in production of the lens panel to machine a grooved metal plate or metal embossing roll encompassing the width of the lenticular lens panel for a particular lens pitch or frequency, which is expensive, particularly if efforts are undertaken to cancel manufacturing variations due to factors such as uneven cooling, variations in expansion and contraction, etc. Instead, a simple extrusion can be used to produce a plastic lens strip.

The lens strip can be, for example, clear acrylic or polycarbonate plastic, with a rounded contour on one side and a flat contour on the other, as shown in FIG. 5. Preferably, the lateral sides of the strip are flattened such that the strip can bear laterally against another strip along the flattened sides, or a spacer or shim can be inserted. In connection with relatively large signs, a 0.75 inch strip width is appropriate, with a radius of curvature on the rounded side of 0.937 inch (focal length 1.437 inches (±0.125") as measured from the flat side of the lens strip to the surface of the image panel). Assuming that the sign or display is to be changeable between two distinct fields, the interleaved strips of the images are thus 0.375 inches in width, namely half the width of the lens strips. For even larger signs, or for a coarser division of strips, a wider lens strip (e.g., one inch) with a correspondingly longer radius of curvature (1.25 inches) can be used, the particular dimensions and radii being subject to calculation as dictated by the desired pitch or frequency of the lens strips and the distance between the lens strips and the front surface of the image panel 40.

As discussed above, the lens elements 72 (which comprise one or more lenses 62) abut one another to set the lenses at the proper spacing for the desired pitch. The lens pitch should be regular across the entire width of the display. If the lens pitch is entirely regular and the image strip pitch is also regular but slightly expanded laterally according to a formula based on the desired optimal viewing distance for the sign, all areas of the sign will appear to change from one image field to the other at the same time while the viewer is passing the sign. As can be appreciated with reference to FIG. 6, the optimal distance from the viewer to the display determines the correct relationship of the image pitch to the lens pitch. A particular designer may have in mind a viewer at a closer perspective, whereupon a greater pitch variation is necessary than for viewing from farther away. Typically, for highway billboards and the like, the viewers can be expected to view the sign from a specific distance. It is possible to plan the point at which the display will change from one image to another, allowing a driver passing the sign to view one message during approach and another message as the driver comes to a particular point. A similar arrangement using horizontally disposed lenses and image strips on an overpass or the like can present a first image to passing drivers while approaching the sign from a distance, and a different image as the driver's perspective angle changes due to closer approach and passing under the sign.

Figure 6:
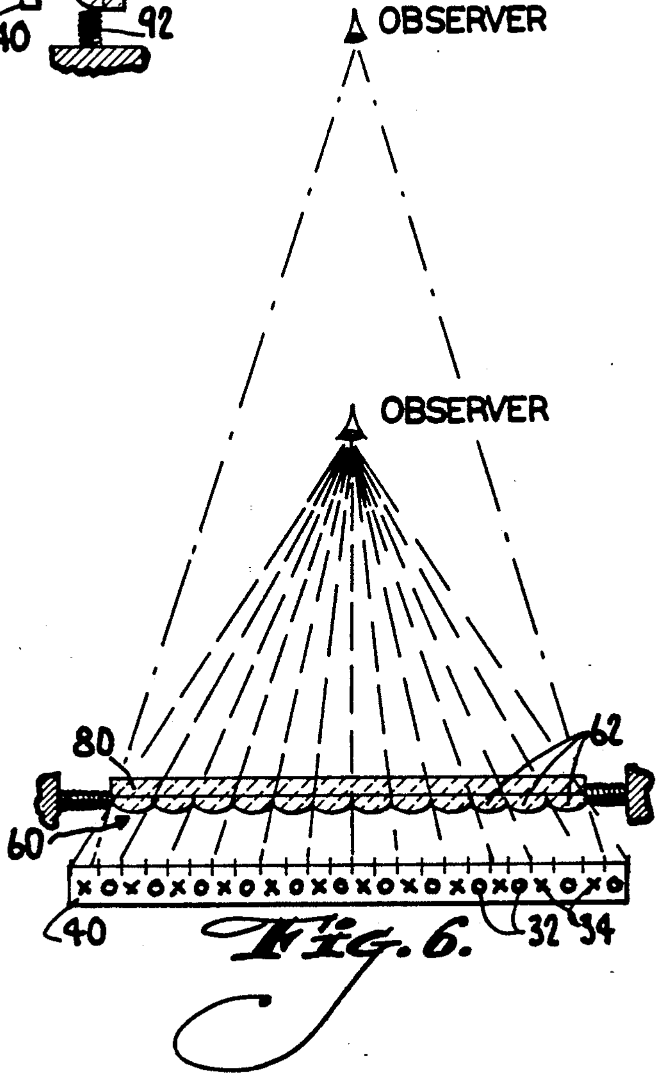
FIG. 6 is a partial section view through an embodiment wherein the pitch spacing of the lens panel is greater than that of the image panel.

Preferably the interleaved pattern of the image strips is generated via a computer graphics technique, whereby it is a simple matter of programming to increase the pitch across the entire face of the image panel. The preferred method for varying the pitch is to do so at the image strips 32, 34, maintaining the lens strips 62 at a smaller uniform pitch spacing as shown in FIG. 6.

For a roadside sign, for example, to be viewed from around 500 feet (a nominal viewing distance for a large billboard), the image pitch is increased or enlarged laterally, i.e., in the direction perpendicular to elongation of the lenses. The width of an image panel for use with a ten foot width of lenses (or overall height if the lenses are elongated horizontally) would exceed the lens panel width by about 0.5 inch. Such a sign can be viewed from far away, and is acceptable at as close as twenty feet. A larger difference in width is appropriate for closer viewing and a smaller difference is appropriate for viewing from farther away.

An inexpensive extrusion of clear polycarbonate or acrylic plastic will normally be characterized by a relatively large dimensional tolerance. For example, at a nominal width of 0.75 inch extruded lenses will normally fall within the large dimensional tolerance of about ±0.010 inch. Therefore, the individual lens strips may be anywhere from 0.740 to 0.760. A twelve foot display would have 192 lens strips of nominal width, but due to the foregoing dimensional tolerance of the lens strips the overall width could vary anywhere between 11 feet 10 inches to 12 feet two inches, a distance of more than five strips. Of course variation in the position of the lens elements of a fraction of a lens width would render the sign inoperable to change crisply from one display to another. It may occur that the dimensions of a supply of lenses will vary on both sides of nominal, such that the dimensional variations cancel out and the pitch of the lenses on the lens panel remain substantially at the required positions over the grouped image segments. However, the lenses in a particular extrusion batch may all be larger than nominal or all smaller than nominal.

According to the invention this difficulty is preferably overcome by using lens elements that comprise more than a single lens. The lens elements are made to exact tolerances (e.g., ±0.001") by attaching together a plurality of lens strips such that the distance between the side edges of the laterally outermost lens strips in the element is precise, even though the lens strips themselves may vary Within their tolerances. For example, to obtain a nominal lens pitch spacing of 0.75", the lens strips are actually made to a nominal size of 0.740 and thus vary between 0.730 and 0.750. In attaching the lens strips together to form a lens element, the outer sides of the laterally outermost lens strips are correctly spaced to define an integer multiple of 0.750, for example by placing the lens strips between barrier walls of a jig and urging at least the outermost strips to rest against the barrier walls. While it would also be advisable to correctly space any intermediate lens strips (assuming there are three or more included in the lens element), the step of fixing the outermost dimensions of the lens element is effective to prevent any variation in pitch from accumulating. Therefore the pitch of the overall lens panel is much more accurate than is possible using discrete lenses which are not connected to define lens elements, and also more accurate (as well as less expensive) than an integral lens panel.

The particular mounting structure for attaching a lenticular display to a base according to the invention facilitates the use of the separate lens elements, and also provides access to the arrangement such that the copy can be changed and the lenses can be cleaned or otherwise serviced. Means are provided for removably mounting an image panel on a base, such as the upward flange 206 on base 202, shown in FIG. 1. The image panel is provided with a complementary downward flange which attaches the image panel to the base 202, at least at the top. This relatively simple arrangement makes the image panel easily changeable. The lower edge of the image panel need not be rigidly attached relative to the base 202 because the lens panel includes standoffs or spacers 69 to set the critical dimension between the lenses and the surface of the image panel. Accordingly the position of the lower edge of the image panel relative to the base 202 is not so critical (although a spacer 203 preferably positions it at least generally at a space from the base substantially equal to the space defined between the image panel and the base at the top). Similarly, the width of the image panel 40 need not be closely regulated.

Figure 8:
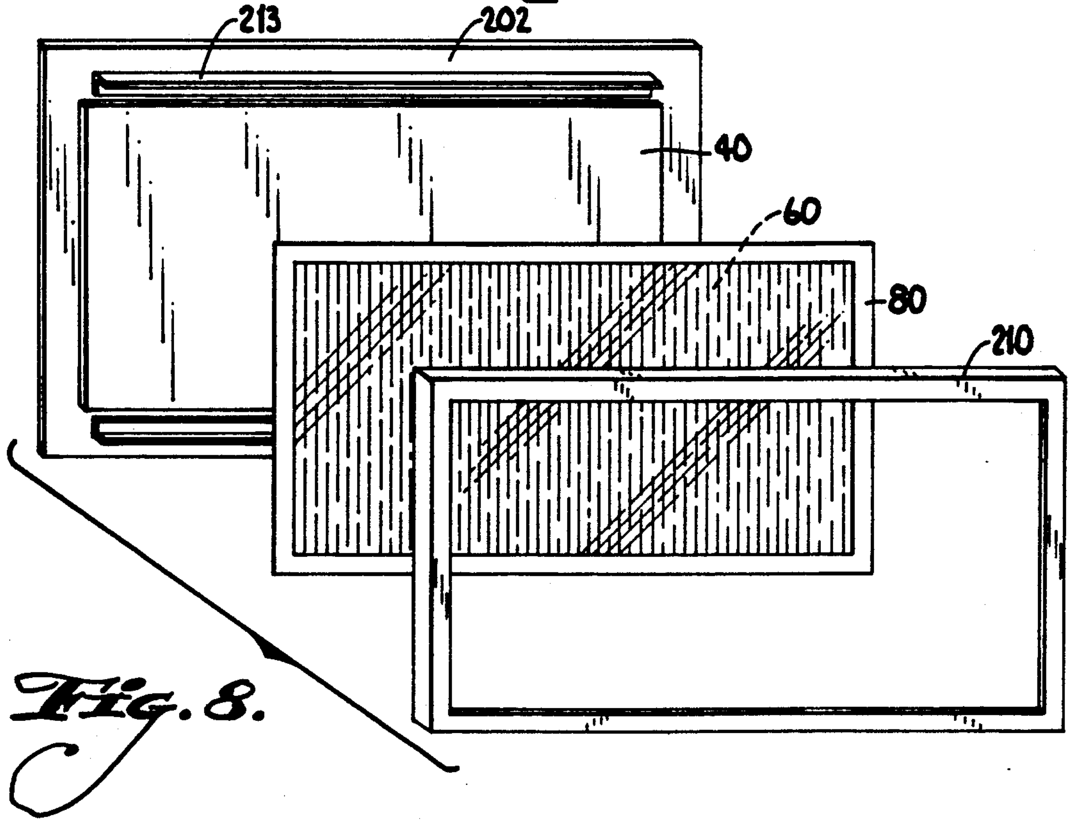

FIG. 8 illustrates the respective parts in an exploded elevation view. A framing bracket 210 is fixed to the base 202, extending over the top of the image panel. The framing bracket 210 has means such as an upward flange 215 as shown in FIG. 1, spaced from the base for receiving a transparent facer panel, i.e., suspending the facer panel from its top 82, at a distance from the image panel 40 which will place the lens elements 72 within range of their focal length spacing from the front surface of the image panel. The plurality of lens elements, elongated vertically, are arranged on a rear side 86 of the facer panel 80. The lens elements include at least one, and preferably a plurality, of elongated lenses 62 having a flat side 64 disposed against the rear surface 86 of the facer panel 80, and a rounded side 66 directed towards the image panel 40. Spring fasteners 96 resiliently suspend the lens elements from the facer panel adjacent the top of the facer panel, thereby allowing the lenses to expand and contract freely. A plurality of spacer posts 69 protrude from the lens elements to the front surface of the image panel 40, the spacer posts thereby accurately setting the lens elements at the necessary distance from the image panel, i.e., corresponding to the focal length of the lenses.

The framing bracket preferably extends around the full periphery of the sign, and is arranged to be removable as a unit for access to the facer panel, lens panel and image panel. It is also possible to provide separable elements along a side, along the bottom, etc., removable for access to the image panel and/or lens panel. Insofar as clearance is provided between the facer panel and the inside front of upper bracket 210, between the rear of the image panel and spacer 203, or between the front of the facer panel and the inside of the lower bracket, resilient seals 204 or the like can be provided to urge the free portions of the respective panels to bear against one another whereby the lenses remain positively positioned relative to the image panel via the spacers 69.

The display is arranged for easy access to the lenses and to the image panel. Sufficient clearance between the tops of the lens panel and the image panel allows the panels to be lifted upwardly from their respective flanges, and sufficient clearance below the bottoms of the panels likewise allows the disconnected panels to be dropped toward the bottom bracket and tilted forward clear of the top bracket. The panels can also be made removable laterally to the sides by an appropriate removable cover permitting the panels to slide sideways along their flanges. This permits easy changing of the image panel, and/or access to the lens elements for cleaning, position adjustment or other required functions. At all times the facer panel protects the lenses and the image panel from dirt, damage and the like. Preferably, the entire outer framing bracket, lens panel and facer panel can be demounted, replaced by a similar frame, and taken away for cleaning or other service.

The framing bracket 210 can be mounted on an angle iron bracket 213 bolted to the base 202 as shown in FIG. 1. Preferably a threadable attachment such as eye 211 is provided to adjust the framing bracket 210 (as well as the lens panel carried therein), also forming a convenient means to lift the framing bracket into place. Two threadable attachments 211 are provided at spaced locations along the top of the framing panel. By adjusting the extension of the two attachments 211 relative to the angle iron bracket 213, the framing bracket (and lenses) can be adjusted to obtain a precisely parallel arrangement of the lenses to the image strips.

The sign of the invention has been described primarily with reference to an array of vertically elongated strips and lenses, which select different images as the viewing angle changes in a horizontal plane. The invention is also fully applicable to arrangements wherein the lenses and image strips are elongated horizontally (or in another direction) and the viewing angle changes in a vertical plane, etc. Accordingly, the designations "horizontal," "vertical," "top," "side" and the like are not meant to be limiting, but only to explain the relative orientations and positions of the respective structures.

The invention having been disclosed, additional variations within the reasonable scope of the invention will now become apparent to persons skilled in the art. Reference should be made to the appended claims rather than the foregoing specification to assess the scope of the invention in which exclusive rights are claimed.

I claim:

1. A sign for selective display of multiple image fields, comprising:

an image panel having at least two image fields, subdivided into image segments, grouped said image segments from each of said at least two image fields being spaced to define an image pitch spacing extending across at least one of a length and width of the display;

a lens panel having lenses defining a lens pitch spacing, the lens pitch spacing corresponding substantially to said image pitch spacing, the lens panel comprising a plurality of discrete and relatively movable lens elements, each said lens element having at least one said lens, the lens elements being dimensioned to abut one another to position the lenses at said lens pitch spacing, the lenses and the image segments being defined by elongated strips, the lenses being fixed relative to the image panel and at least some of the lenses being movable relative to one another along abutments parallel to a line of elongation of the lenses;

means for mounting the lens elements adjacent one another over the grouped image segments of the image panel, so as to allow relative motion between abutted ones of the lens elements in at least one direction; and, a transparent facer panel defining first opposite edges in the direction of elongation, the lens elements being mounted to the facer panel at least at one of the opposite edges.

2. The sign according to claim 1, wherein the image segments and lenses are elongated vertically, and further comprising a transparent facer panel defining a top and a bottom, the lens elements being suspended from the top of the facer panel.

3. The sign according to claim 1, further comprising laterally bearing resilient means operable to urge the lens elements into abutment in a direction perpendicular to the direction of elongation.

4. The sign according to claim 1, further comprising a resilient fastener between each of the lens elements and at least one of the opposite edges of the facer panel.

5. The sign according to claim 1, wherein the lens elements are attached to the facer panel at the top of the facer panel, and further comprising means for exerting a laterally inward pressure on the lens elements.

6. A sign for selective display of multiple image fields, comprising:

an image panel having at least two image fields, subdivided into image segments, grouped said image segments from each of said at least two image fields being spaced to define an image pitch spacing extending across at least one of a length and width of the display;

a lens panel having lenses defining a lens pitch spacing, the lens pitch spacing corresponding substantially to said image pitch spacing, the lens panel comprising a plurality of discrete and relatively movable lens elements, each said lens element having at least one said lens, the lens elements being dimensioned to abut one another to position the lenses at said lens pitch spacing, the lenses and the image segments being defined by elongated strips, the lenses being fixed relative to the image panel and at least some of the lenses being movable relative to one another along abutments parallel to a line of elongation of the lenses;

means for mounting the lens elements adjacent one another over the grouped image segments of the image panel, so as to allow relative motion between abutted ones of the lens elements in at least one direction; and, a substantially transparent facer panel, and wherein the lenses, in cross-section, have a flat side and a rounded side, the flat side being disposed against a rear side of the facer panel and the rounded side being oriented toward the image panel.

7. The sign according to claim 6, further comprising a spacer post protruding from at least some of the lens elements in a direction perpendicular to the image panel, the spacer post maintaining a correct focal length of a respective lens relative to the image fields on the image panel.

8. The sign according to claim 6, wherein the lens panel and the image panel are composed of materials having substantially equal thermal expansion properties.

9. The sign according to claim 6, wherein the lens elements define elongated strips, each of the elongated strips having at least two lenses, and further comprising a connector bridging the at least two lenses of each said lens element and a fastener connecting the lens element to opposite edges of the facer panel.

10. The sign according to claim 9, wherein the lens elements each comprise an even number of lenses attached in lateral abutment by connectors adjacent opposite ends of said lens elements, the connectors attaching to the fastener, the fastener engaging one of the opposite edges of the facer panel.

11. A large format sign for selective display of changing images, comprising:

an image panel having at least two image fields, subdivided into image segments, grouped said image segments from each of said at least two image fields being regularly spaced to define an image pitch spacing;

a lens panel having lenses defining a lens pitch spacing, the lens panels comprising a plurality of discrete and relatively movable lens elements, each said lens element having at least one said lens, the lens elements being dimensioned to abut one another with the lenses disposed at said lens pitch spacing, wherein the lens elements and the image segments are elongated strips, fixed relative to the image panel, the lens elements being movable relative to one another along abutments parallel to a line of elongation of the lenses;

means for mounting the lens elements adjacent one another over the grouped image segments of the image panel, so as to allow relative motion between the lens elements in at least one direction and such that the image pitch spacing is greater than the lens pitch spacing, by an amount placing the image strips substantially in line with the lenses from a viewing location at a finite distance from the sign; and, a facer panel having opposite edges, the lens elements being suspended by ends of the lens elements from at least one of the opposite edges, and further comprising resilient means bearing laterally inwardly on the lens elements in a direction perpendicular to said line of elongation.

12. The large format sign according to claim 11, wherein each of the lenses has a flat side and a rounded side, the flat side being disposed against the facer panel and further comprising a spacer post protruding from at least one of the lenses to the image panel for spacing the lenses from the image panel at a correct focal length of the lenses.

13. A mounting format for attaching a lenticular sign to a base, comprising:

means for removably mounting an image panel on the base, the image panel having at least two selectable images defined by interleaved lenticular strips;

a framing bracket fixable to the base and having means spaced from the base for receiving a transparent facer panel, the framing bracket including a removable segment for access to at least one of the lens panel and the image panel;

a plurality of elongated lens elements arranged on a rear of the facer panel, the lens elements including elongated lenses having a flat side disposed against the facer panel and a rounded side directed towards the image panel;

means for resiliently mounting the lens elements on the rear of the facer panel;

a plurality of spacer posts protruding from the lens elements to the image panel, the spacer post setting the lens elements at a distance from the image panel corresponding to a focal length of the lens segment; and, a further bracket affixed to the base, the framing bracket being mounted to the base at least along the further bracket affixed to the base, the framing bracket being adjustably positionable relative to the further bracket at points spaced in a direction perpendicular to a line of elongation of the lenses, whereby adjustment of the framing bracket relative to the base regulates parallelism of the lenses relative to the lenticular strips of the image panel.

14. The mounting format according to claim 13, wherein the lenses and the lenticular strips are elongated vertically and the framing bracket is positionable relative to the further bracket by threadable means spaced horizontally along the framing bracket.

* * * * *